Aug. 15, 1933.  H. J. BARKER  1,922,612
CHICK FOUNT AND FEEDER
Filed Jan. 7, 1922  2 Sheets-Sheet 1
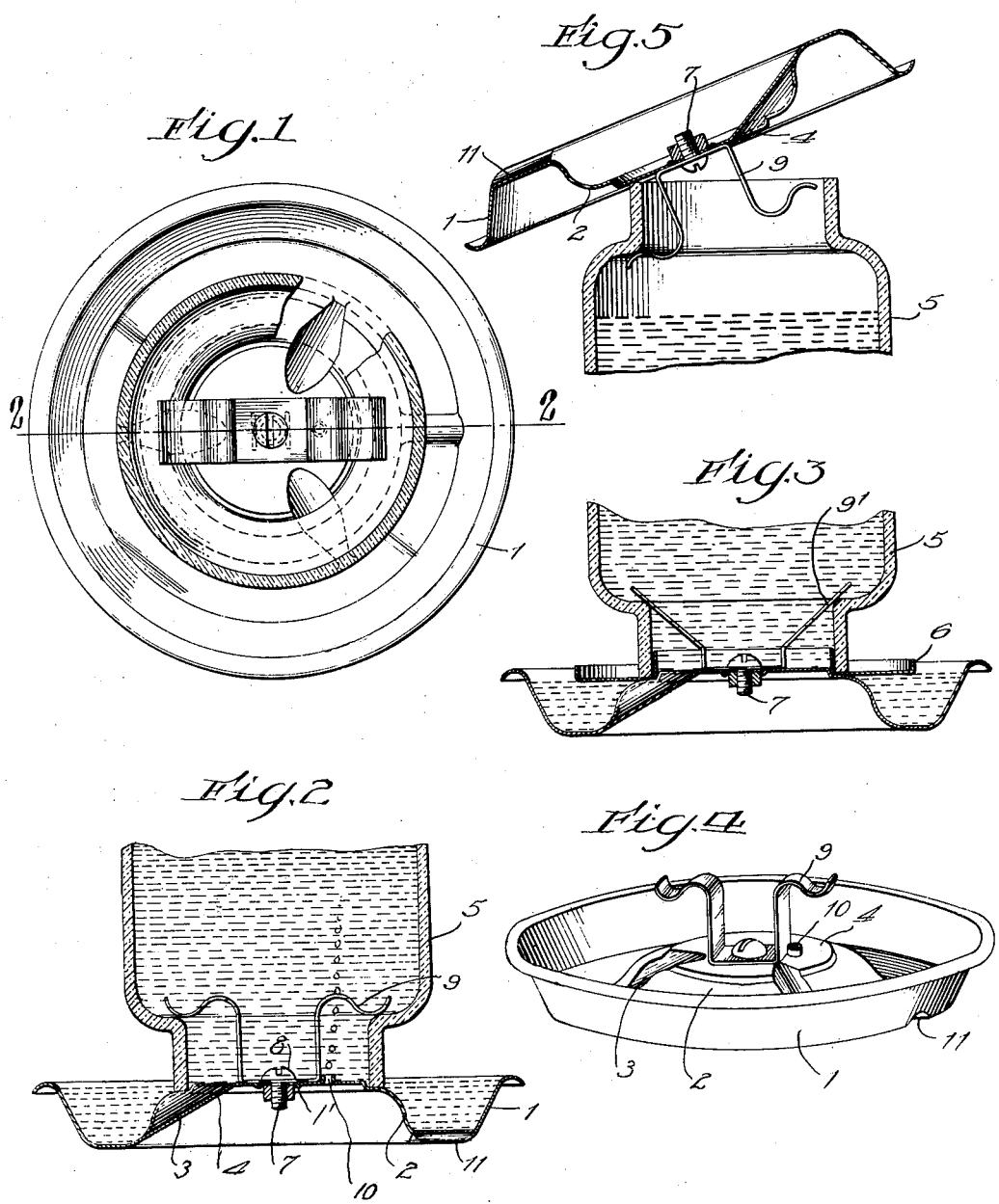

Aug. 15, 1933.  H. J. BARKER  1,922,612
CHICK FOUNT AND FEEDER
Filed Jan. 7, 1922   2 Sheets-Sheet 2
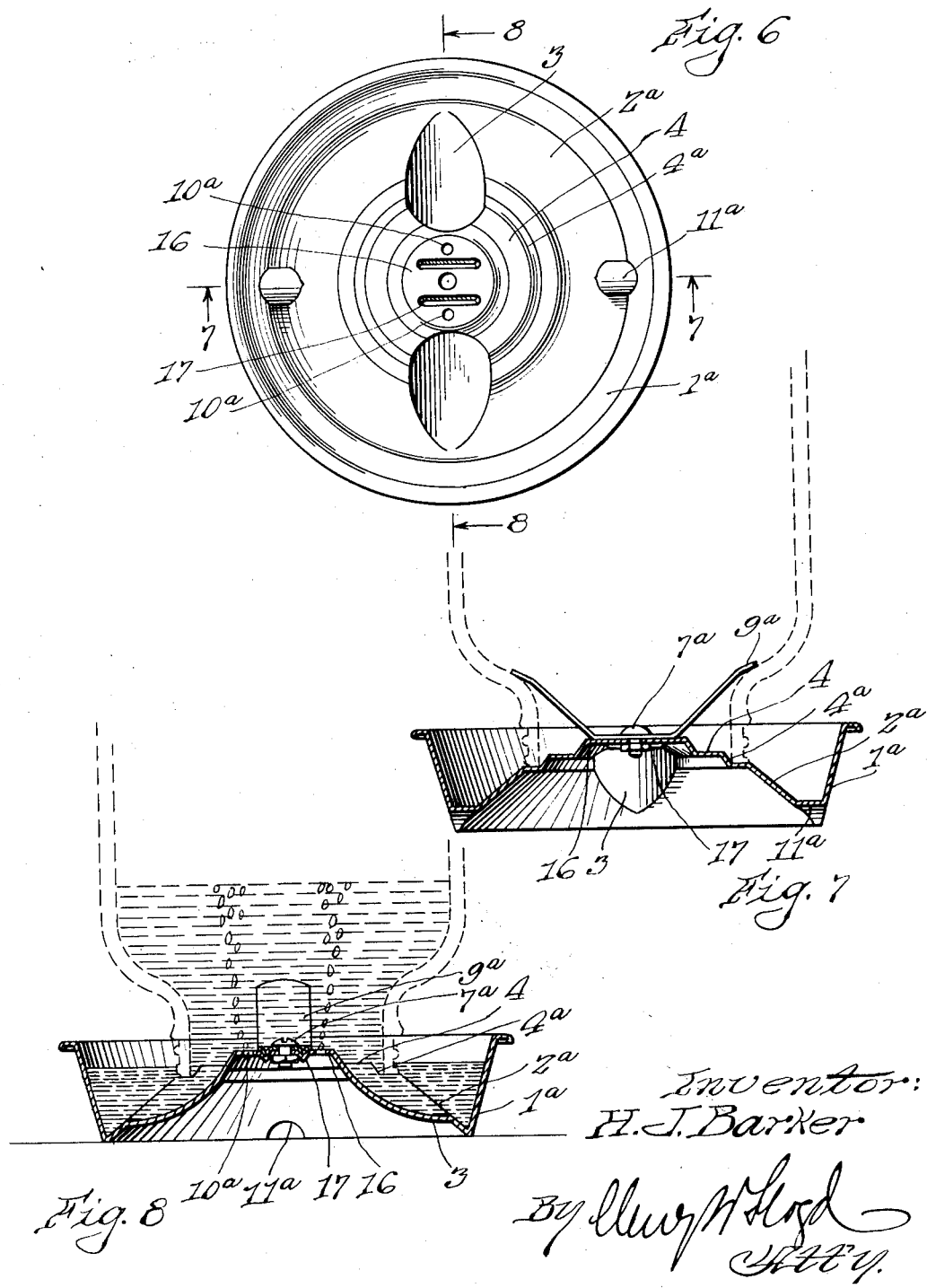

Patented Aug. 15, 1933

1,922,612

UNITED STATES PATENT OFFICE 1,922,612

CHICK FOUNT AND FEEDER

Harry J. Barker, Chicago, Ill.

Application January 7, 1922. Serial No. 527,741

33 Claims. (Cl. 119—77)

The present invention has to do with hydraulics and relates particularly to the control of contained liquids.

It is, primarily, the object of my invention to arrange for the predetermination and maintenance of fluid displacements and for the automatic regulation of fluid levels.

Secondarily, it is an object of my invention to provide a unique association of a liquid supply and discharge means.

Additionally, it is my object to provide a novel chick fountain and feeder in which a trough is held upon a reservoir or supply tank by internal guide and fastening members and in which the level in the trough is substantially constant; the reservoir and trough being capable of quick assembly and separation, but while in assembled relation locked against separation, the troughs when disassociated being capable of resting one upon another to admit of packing in reduced space.

These and such other objects as may hereinafter appear are attained by the novel construction, arrangement and combination of parts to be described in the specification which follows. Reference will now be had to the accompanying drawings which I have selected to disclose my invention.

Figure 1 is a top plan view of one embodiment of my invention;

Figure 2 is a vertical section of the device taken at the line 2—2 in Figure 1;

Figure 3 is a vertical cross sectional view of a different embodiment of the present invention;

Figure 4 is a perspective view of the base disclosed in Figure 1;

Figure 5 is a vertical section showing manipulation of one type of trough;

Figure 6 is a top plan view of the preferred embodiment of my invention;

Figures 7 and 8 are details in vertical section taken as respectively indicated by the lines 7—7 and 8—8 in Figure 6.

Like parts are referred to in the accompanying drawings and in the specification which follows by similar reference characters.

For the purpose of disclosing my invention, I have selected the simplest application thereof which I have been able to conceive, a poultry or chick fountain and feeder.

Referring first to Figures 1, 2, 3, 4, and 5, the ordinal 1 designates a base, pan, or trough of suitable material and here shown as of flanged circular configuration. The central portion of the base 1, if of metal, is raised by suitable means, for example, stamping, to provide an elevated rest or platform 2 having one or more U or V like radial depressions 3. The central portion of platform 2 is additionally raised as indicated at 4 forming a circular internal guide for and extending upwardly into the mouth of a reservoir or jar 5 inverted upon said pan or trough 1, in the manner disclosed in Figures 2 and 3. A circular plate or annulus 6, as shown in Figure 3, may be used intermediate the base 1 and the reservoir or jar 5. Such plate 6 has a flat portion and upturned edges or rims, the internal edge or rim falling within the neck of the jar 5. Its purpose is to reduce the exposed portion of liquid and to prevent chicks from falling therein as well as to protect the liquid from dirt.

Through a centrally disposed aperture in the base 1, a bolt 7 having a slotted head 8 is passed from above after inserting said bolt through an elongated clip or clamp member 9 adapted to engage the interior of the jar reservoir 5. Bolt 7 is then inserted into a square or hexagonal nut which, when tightened upon said bolt 7, abuts the under surface of base 1 and is secured against rotative displacement by parallel downward projections 1', in said base, which projections engage opposite sides of said nut as indicated in Figures 2, 3, and 5. In attaching the clip or clamp member to the base 1, it is usual and also expeditious to use a screw driver to rotate the bolt 7, holding the nut in the fingers until the projections 1' engage the sides of said nut. The bolt then may be tightly screwed upon the base 1 to firmly secure the clip or clamp member 9. Intermediate clamp member 9 and the upper surface of base 1, a washer may be used if desired, but this is not necessary.

The clip or clamp member 9 shown in Figures 1, 2, 4, and 5, is of flat metallic strap material, bent upwardly and outwardly from substantially its middle section and having its extremities in position to yieldingly engage the interior of the reservoir 5 at the shoulders thereof. In the drawings, the reservoir 5 is an ordinary Mason or fruit jar, but any type of bottle or jar may be substituted therefor. The material of 9 may be resilient or spring-like but this is not necessary. Such a composition as may be reshaped to secure a more or less firm contact with the reservoir 5, and as will accommodate a reservoir having an interior configuration not corresponding with that of the standard fruit jar, may be employed.

For use of this embodiment of my invention, the reservoir 5 is held neck uppermost and then filled with liquid to a sufficient depth. Base 1 is grasped at an oblique angle such as shown in figure 5 and inserted, one end of member 9 foremost, until the limit of inward movement in this direction is attained, when the base 1 is inclined to become parallel with the mouth of reservoir 5, thus swinging clamp member 9 into position to grip the reservoir 5 at the slightest movement toward separation of said reservoir and base 1. The jar 5 is inverted quickly. The liquid within reservoir 5 will run out slowly through depression or depressions 3 in the rest or platform 2 until the liquid in base 1 reaches a horizontal level slightly below the mouth of reservoir 5, as is indicated in Figure 3.

By providing a passage 10 in base 1, such as a small circular aperture illustrated in Figure 2, the uppermost extremity of which projects above the horizontal plane of centrally disposed guide elevation 4, the liquid level in base 1 will be in an elevated plane, and only a slight fraction of an inch below the top of air passage 10, as is shown in Figure 2. Air will pass upward through 10 but no liquid can escape downward therethrough unless the diameter of said passage 10 is excessively large and of greater magnitude than here shown. The apertures 10, in the form of the invention now being described, and the similar apertures in the forms of the invention later to be discussed, serve an additional function. If it is desired to fill the reservoir with out removing the pan from the jar, this may be done by merely turning the jar up-side-down with the basin attached thereto, and pouring water into the reservoir through the apertures 10. When this is being done, the material of the basin adjacent the crown forms a funnel, guiding and directing the liquid into the reservoir by way of the said apertures 10.

In the embodiment of the invention disclosed in figures 2 and 4, a passage 11 to admit air beneath the base 1 is provided by forming a slight radial groove.

In Figure 3, a second type of clip is illustrated. By using this clip or clamp 9' much material is saved. To attach a base 1 having this type of clip, one of the extremities of said clip 9' is inserted into reservoir 5 and while forcing the base 1 in the direction of the inserted end of clip 9', said base is inclined against the mouth of the reservoir 5. Released from the pressure upon one side, base 1 springs, with a quick snap, into locked position upon the jar 5. Internal guide members 4 extending upwardly into the jar mouth insure that the reservoir will be always concentrically disposed with respect to the base 1, and accidental displacement is instantly perceived and readily corrected.

During shipment of the base or trough members 1, the clips 9' or 9a may be inverted and attached to the base by means of screw 7, but with the two ends of the clips projecting downwardly into the base. A compact unit readily adapted for shipping is had in this manner. Moreover, the body, or ends, of the clip members engage the material of the trough so that circulars or instruction sheets printed on paper may be inserted thereunder to be held impingedly to the base.

Experiment discloses that water levels in the construction shown in Figure 3 vary as much as three-eighths to one-half inch in small vessels. For liquid to escape from the reservoir, air must be admitted. The struggle of the air to get into the jar counterbalances the efforts of the liquid to escape therefrom—often a film appears to have been formed upon the water (if it is the liquid employed) whereby it is walled in. The air vent shown in Figures 2 and 4 overcomes this difficulty and as the liquid is withdrawn, bubbles of air rise through air passage 10. Drops of liquid immediately escape from reservoir 5 into pan 1 to replace that lost.

In Figure 3, the liquid level is more or less imperfectly controlled by the mouth of reservoir 5. This level, once below the horizontal plane of said mouth, always remains therebelow, varying as much as has already been indicated. But in the embodiment shown in Figures 2 and 4, the liquid level is governed by the air passage 10 and remains substantially constant in a horizontal plane about one-eighth of an inch below the top of said passage. Raising or lowering of said passage, therefore, provides means for the control of liquid level independent of the horizontal plane in which the mouth of the reservoir 5 lies.

In Figures 6, 7 and 8 the preferred form of my invention is illustrated. A trough 1a of the same general configuration as base 1 previously described is provided. This has an elevated central portion 2a which is additionally elevated in stages to form, first, the reservoir guide 4a, a horizontal section 4, and then, what may be termed a crown or a clip seat 16. Radially arranged wide shallow grooves 3 extend from the seat 16 to the lowermost portion of trough 1a while small radial grooves or passages 11a are disposed at right angles thereto to admit air beneath the base 1a.

Three holes or perforations are punched through seat or crown 16, the outermost 10a being air passages while the inner is centrally situated to allow passage of a bolt 7a used to attach a clip 9a to be later described. Perpendicular to a line passing through the center of all of said holes are two depressions or short parallel grooves 17, arranged equidistant from the central or bolt aperture.

Said clip 9a has a middle section, substantially straight end sections, and horizontally bent extremities adapted to rest upon the internal shoulder of a reservoir. Clip 9a upon its under side and middle section and parallel with the sides thereof, has spaced depressions adapted to engage with and be seated within the grooves 17 of base 1a. The grooves 17 and those in clip 9a may be formed by stamping or in any other suitable manner.

The depressions 17 tend to reinforce the material of the crown or seat 16 at its weakest part (intermediate the apertures therein) while the depressions in the clip 9a reinforce said clip at its most central point—adjacent the aperture therethrough and at the section where the whole strain from the extremities of the clip is centered.

Additionally, the complemental depressions just described determine the proper association of the parts, 1a and 9a. Depressions 17 form locking shoulders for the nut carried by bolt 7a in the same manner as do the depressions 1' in base 1.

But the depressions in 9a perform additional functions. When properly seated in depressions 17, they prevent rotation of clip 9a and when so seated, the air holes 10a are open. Without these depressions, the holes 10a might be inadvertently closed by moving the clip thereover. But if the clip 9a is placed improperly upon seat 16, and the air passages 10a covered thereby, said air passages will continue to function for the depressions in clip 9a elevate the body of said clip above said air passages so that air may pass freely.

To fasten any base provided with a clip 9a upon a reservoir, the operations described with respect to clip 9' are exactly followed.

The form of invention disclosed in Figures 6, 7 and 8 has a distinct advantage in that the clip member 9a and bolt 7a may be removed to allow nesting of the pans 1a. Thirty-six of the pans may thus be nested, the clips 9a nested in stacks of nine each and packed in the top pan 1a and the bolts and nuts packed in the depression in the lower pan. This allows an immense saving in space and in container costs.

It is to be understood that all possible embodiments of my invention are not here disclosed; therefore, it is not my intention to be limited to such embodiments, but to include all modifications, changes and alterations coming within the scope of the claims appended hereto.

The size of the apertures through the bottom of the fountain may vary. For the admission of air, the diameter of the aperture may be slight, but when the aperture is to be used both for the passage of air and for filling the fountain with liquid, it may be enlarged to a diameter of approximately three-eighths of an inch without becoming critical in respect to water. In fact, larger apertures than three-eighths of an inch in diameter may be employed but require skill in handling to prevent initial leakage.

Having thus described my invention, what I claim is new and desire to procure by Letters Patent of the United States, is:—

1. A fountain comprising a basin to receive liquid, a reservoir upon said basin, and a resilient member having divergent extremities enclosed by said reservoir for engaging said reservoir in an upright position upon said basin.

2. In combination, a basin, a reservoir, and a resilient intermediate member having spreading arms for engaging the interior of said reservoir for maintaining said reservoir in connected relation upon said basin.

3. A pan, a clip, means upon said pan for holding said clip thereon, and a reservoir, said clip holding said reservoir on said pan, and said clip and pan having interfitting parts for reinforcing the material thereof and for preventing relative rotary movement therebetween.

4. A basin, a jar reservoir, and an aperture through the bottom of said basin too small for the passage of water outwardly and opening into the atmosphere for admitting air into said reservoir, said aperture being in a plane above the mouth of said reservoir.

5. In a chick fountain, a base having an elevated guide portion provided with an uncovered air passage therethrough too small for the discharge of water outwardly and opening directly to the atmosphere, and a jar reservoir disposed around said guide portion.

6. In a fountain, a jar reservoir, and a pan base having a guide portion with apertures therein too small to permit of the passage of water and extending inwardly of said reservoir a predetermined distance whereby to control the level of the liquid in said base, the external portion of said guide portion being directly open to the atmosphere.

7. In a chick fountain, an uncovered jar reservoir, and a trough, said trough having a perforated bottom extending into said reservoir, the perforations in said bottom being too small to permit of the discharge of water therethrough when said reservoir contains water and is inverted thereover.

8. A chick fountain comprising a trough, and a reservoir, said trough comprising a pan-like member provided with an aperture above the lower level of said reservoir and too small to permit of the passage of water and forming an air passage through the bottom thereof to the atmosphere.

9. A chick fountain comprising a trough, and an inverted jar reservoir, said reservoir abutting said trough and said trough having within the area covered by said reservoir a permanently open air passage too small to permit of the passage of water and opening directly into the atmosphere, said passage being above the lower level of said reservoir.

10. A chick fountain comprising a trough, and a jar reservoir, said trough having a direct air passage to said reservoir above the lower level of said reservoir and too small to admit of the passage of water and adapted to remain open to the atmosphere independently of the position of the water level in said trough.

11. In a fountain, a jar reservoir, a base having a wholly vertical passageway through its bottom and above the lower level of said reservoir and too small to permit of the passage of water and directly open to the atmosphere, the discharge of liquid into said base from said jar reservoir being controlled by the balanced forces of the gravity of the liquid, the vacuum in said jar reservoir above said liquid, and the external air pressure.

12. In a chick fountain, a pan having a fastening means thereupon for a reservoir, and a jar reservoir inclosing said fastening means, said pan and said fastening means being adapted to nest with a plurality of other and similar pans and fastening means respectively.

13. A fountain comprising a jar reservoir, and a basin having an air passage through the bottom thereof into said reservoir, said passage having its upper end in a plane above the horizontal plane of said basin upon which the reservoir rests and being entirely covered by liquid in said reservoir, said basin having a generally flat central portion to support said reservoir and being provided with irregularities to allow a passage of liquid between said reservoir and basin, the air passage in said basin admitting air thereto as liquid flows by way of said irregularities.

14. A chick fountain comprising a basin having a perforated central portion and a radial groove, the perforations in said central portion being too small to admit of the passage of water and an inverted reservoir disposed upon said basin above said perforated portion, air being admitted to said reservoir by way of said groove and perforated portion.

15. A chick fountain comprising a reservoir, and a basin having perforations in the bottom thereof too small to admit of the passage of water therethrough beneath said reservoir and radial depressions whereby channels are provided for the discharge of liquid from said reservoir and for the admission of air into said reservoir through the perforations in said basin.

16. As a new article of manufacture, a poultry watering device comprising in combination with a jar, a basin provided with a raised portion having apertures therein too small to permit of the passage of water therethrough and having grooves of reversed configuration providing channels between said basin and said jar reservoir and between said basin and the object upon which said basin is disposed for the respective passage of liquid and of air, and a clip member upon said raised portion and adapted to grip from within said jar reservoir.

17. In a drinking fountain, the combination with a reservoir and a trough adapted to be supplied with water from said reservoir, of a continuously open, perforate filling passageway communicating with said reservoir through the bottom of said trough and of sufficiently small cross section to prevent the escape of water therethrough while covered by liquid in said reservoir when the fountain is in use.

18. A chick fountain comprising a basin adapted to hold water or the like, a jar reservoir inverted thereon, and a reversible connecting member therebetween, said connecting member when in operable position being adapted to project inwardly of said reservoir to resiliently engage the shoulders thereof internally and above its neck and to lie flat against said basin when said basin and connecting member are knocked down for shipment.

19. A chick fountain comprising an inverted jar reservoir, a base, and a connecting member therebetween, said connecting member being adapted to be disposed upon said base and project inwardly of said jar and to resiliently engage the shoulders thereof internally and above its neck when in operable position and providing when said base and said connecting member are knocked down for compact shipment a two-ended clip-member adapted to secure objects to said base at either or both of the clip ends.

20. The combination with an inverted jar reservoir of a base and a clip member, said clip member when disposed in one position upon said base member resiliently engaging the shoulders of said reservoir internally and above its neck and providing a connecting member between said base and a jar reservoir, and when in an inverted position resiliently engaging the top surface of said base whereby to form means for gripping an object.

21. The combination of a basin and a clip member, said basin and said clip member having complementary flat portions, and said clip member having two wings angularly disposed with respect to the flat portion thereof, said clip member when disposed in one position upon said basin being adapted to provide a connecting member extending inwardly of a jar reservoir to be held upright upon said basin, and in another position being adapted to resiliently engage adjacent its ends the top surface of said basin whereby to secure an object intermediate said clip member and said basin.

22. A new article of manufacture comprising a basin, and a clip member detachably secured thereto, said basin having a crown portion, and said clip member having a relatively flat portion coextensive with said crown, and ends of said clip member when in operable position being adapted to extend inwardly of a jar reservoir to secure such jar reservoir upon said basin, and being adapted to resiliently engage said basin adjacent its ends when in inverted position.

23. In combination with and for use with a jar reservoir, a basin having a crown, and a clip member adapted to be seated upon said crown, said crown and clip member having interfitting portions whereby said clip member is held against rotation when disposed upon said basin in operable position, the inverting of said clip member disengaging said interfitting parts and providing a separation between said basin and said clip member whereby the ends of the latter are adapted to resiliently engage the top surface of said basin to provide gripping members for an object to be held intermediate said clip member and said basin.

24. A new article of manufacture for use with a jar reservoir comprising a base having radial grooves, and a connecting member adapted to project inwardly of said reservoir when in operable position and to rest in said grooves when knocked down for compact assembly.

25. A fountain comprising a pan base having uncovered apertures therein to provide air passages through the bottom thereof, and an inverted reservoir having a mouth provided with a marginal portion in engagement with said pan base, the apertures in the bottom of the pan being above the level of the lower edge of the reservoir and of a diameter such that the liquid in said reservoir provides closure means for the holes in said pan base.

26. A poultry fountain comprising a base forming a receptacle for liquid, and a jar reservoir upon said base, said base extending inwardly of said reservoir and having perforations therethrough beneath said reservoir and above the level of the lower edge thereof and of a diameter too small to permit the liquid in said reservoir to flow outwardly therethrough, said apertures opening into the air whereby the contents of said reservoir are discharged into said base.

27. In a device of the class described, a reservoir, a trough secured to the bottom of said reservoir and adapted to be inverted for filling, and filling passageways in said trough for the flow of water into said reservoir, there being discharge passageways in the form of valleys in said trough beneath said reservoir for the flow of water out of said reservoir, both of said passageways being continuously open, the water in said reservoir and in said trough forming seals for said passageways.

28. A basin, an inverted jar liquid reservoir seated upon said basin, liquid in said reservoir being adapted to flow into the basin by gravity, and means for regulating the level of liquid in said basin comprising an aperture in said basin opening directly to the atmosphere and within the horizontal cross section of the column of liquid in said reservoir, said aperture being large enough to admit of free passage of liquid into said reservoir and not large enough to allow the escape of liquid therethrough when said reservoir is in inverted position.

29. A chick fountain comprising a trough, and jar reservoir, liquid in said reservoir being adapted to flow by gravity into said trough, said trough comprising a pan member having a wholly vertical passage therethrough above the lower level of said reservoir, said passage being too small to permit of the outward passage of liquid and being adapted to be closed at one side by liquid in said jar reservoir while remaining open to the atmosphere at all times at its other side.

30. In a fountain, a trough, and a jar reservoir for holding a liquid, there being a discharge outlet for said reservoir intermediate the lip of said jar and the contiguous surface of said trough, said trough having a passage through the bottom thereof into said reservoir through the mouth of the latter, independent of said discharge outlet, said passage being too small to allow the passage of liquid outwardly of said trough and being within the horizontal cross section of the column of liquid disposed above it in said reservoir and admitting air to said reservoir as water flows into said trough intermediate the lip of said jar and the contiguous surface of said trough.

31. In a fountain, a trough, and an inverted reservoir disposed upon said trough with a passage for liquid between said reservoir and trough, said trough having an aperture in its bottom beneath said reservoir, admitting air into said reservoir when said inverted reservoir contains liquid, such liquid covering said aperture and sealing it against the escape of liquid outwardly therethrough from said reservoir.

32. A fountain comprising a jar reservoir for holding a liquid, a trough having an irregular top surface upon which said jar is inverted, said trough also having a passage through the bottom thereof falling within the horizontal cross section of the column of liquid in said reservoir, the upper level of said passage being above the plane of the mouth of said jar, and means on said trough for holding said jar thereon with its mouth upon such irregular surface of the trough whereby liquid may flow between said jar and trough.

33. In a drinking fountain, the combination with a reservoir, and a trough adapted to be supplied with water from said reservoir, said trough being formed with a filling section in its base comprising a plurality of apertures admitting liquid to the interior of said reservoir but of sufficiently small cross section to prevent the escape of water therethrough from said reservoir when the liquid in said reservoir covers said apertures.

HARRY J. BARKER.